(12) United States Patent
Tages et al.

(10) Patent No.: US 8,624,111 B2
(45) Date of Patent: Jan. 7, 2014

(54) MULTILAYER PORTABLE DEVICE CASE AND METHOD THEREFOR

(75) Inventors: Fernando Tages, Coral Springs, FL (US); Daniel Acero, Miramar, FL (US)

(73) Assignee: A.G. Findings & Mfg. Co., Fort Lauderdale, FL (US)

( * ) Notice: Subject to any disclaimer, the term of this patent is extended or adjusted under 35 U.S.C. 154(b) by 350 days.

(21) Appl. No.: 13/165,299

(22) Filed: Jun. 21, 2011

(65) Prior Publication Data

US 2012/0327565 A1  Dec. 27, 2012

(51) Int. Cl.
*H05K 5/00* (2006.01)
(52) U.S. Cl.
USPC ............................ 174/50; 174/524; 455/575.8
(58) Field of Classification Search
USPC ............................ 174/50, 524, 560; 455/575.8
See application file for complete search history.

(56) References Cited

U.S. PATENT DOCUMENTS

| | | | | |
|---|---|---|---|---|
| 8,268,426 B2* | 9/2012 | Antonini | | 428/40.1 |
| 8,383,216 B1* | 2/2013 | Hynecek | | 428/35.7 |
| 8,509,864 B1* | 8/2013 | Diebel | | 455/575.8 |
| 8,509,865 B1* | 8/2013 | LaColla et al. | | 455/575.8 |
| 8,552,292 B2* | 10/2013 | Qin et al. | | 174/50 |
| 2012/0322517 A1* | 12/2012 | Valdez | | 455/575.8 |
| 2013/0273944 A1* | 10/2013 | Wilson et al. | | 455/457 |

* cited by examiner

*Primary Examiner* — Hung Ngo
(74) *Attorney, Agent, or Firm* — Christopher & Weisberg, P.A.

(57) ABSTRACT

A mobile device case including a housing sized to receive a mobile device; at least a portion of the housing including a first layer, a second layer, and a third layer of material, the second layer of material being disposed between the first and third layers of material and having a material with a higher durometer than the first and third layers of material.

19 Claims, 7 Drawing Sheets

MULTILAYER PORTABLE DEVICE CASE AND METHOD THEREFOR

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to mobile device cases, and in particular, to a multi-layer protective case for mobile devices.

BACKGROUND OF THE INVENTION

As mobile phones and other mobile electronic devices become more technologically advanced and include more features, the cost to purchase these mobile devices increases, as does the cost to replace them should they break. To prophylactically protect such devices from damage or breakage, protective cases have been devised to reduce the risk that a mobile device breaks should it be dropped or otherwise exposed to an impact force.

In particular, two types of materials have generally been employed to reduce the impact force on a mobile device, namely, elastic and resilient materials that absorb impact forces ("soft cases"), and fracture-resistant plastics ("hard cases"). Mobile device cases typically include one or the other of these materials, or include a softer resilient case surrounding a harder plastic case. The resultant device cases often suffer from protection limitations and a low quality user experience. For example, cases exclusively composed of high durometer plastics, or similarly hard materials, often include jagged or sharp corners providing an uncomfortable feeling in the user's hand. Further, high durometer plastic cases, while lending overall durability to the case, often rupture at connection points on two-piece clam shelled cases owing to a lack of resiliency, potentially exposing the mobile device to an impact force.

Conversely, soft resilient cases such as those made from rubber or other elastomeric materials, while providing impact protection, are often large and unwieldy, which mitigates the benefits of having a slim profile mobile device. Further, rubber and other elastomeric materials have high coefficients of friction with a user's hand, and with many surfaces on which the mobile device would be placed, for example, clothing, a hand-bag, or a desk, reducing the mobility of the device as elastomeric materials tend to stick to a surface. As a result, mobile device cases composed of rubber or elastomers, while providing impact protection, may not be aesthetically desirable to consumers, and users often remove the elastomeric case leaving the mobile device either unprotected or vulnerable in plastic cases with minimal impact resistance.

It is therefore desirable to have a mobile device case that incorporates or integrates both impact resistant features of a soft case and the durability features of a hard case into a single easy to use and durable case. It is also desirable to provide for the ability of the user to attach and remove a softer impact absorbing outer case to a harder inner case such that a mobile device is protected and the case remains durable and resilient whether or not the outer case is attached.

SUMMARY OF THE INVENTION

In accordance with one aspect, the present invention provides a mobile device case including a housing. At least a portion of the housing includes a first layer, a second layer, and a third layer of material. The second layer of material is molded between the first and third layers of material and has a higher durometer than the first and third layers of material.

In another aspect, the present invention provides a mobile device case having a housing. The housing includes a first portion matable with a second portion. The first portion and the second portion at least partially defines an enclosed volume therein when coupled together. At least one of the first portion and the second portion includes a first layer, a second layer, and a third layer of material. The second layer of material is disposed between the first and third layers of material and has a material with a higher durometer than the first and third layers of material. A fourth layer of material surrounding at least portion of the housing has a lower durometer than the first and third layer of material.

In accordance yet another aspect, the present invention provides a method of manufacturing a mobile device case. A first layer, a second layer and a third layer of material are molded to form a mobile device case housing. The first and third layers are molded onto the second layer of material. The second layer of material is disposed between the first and third layers of material and has a higher durometer than the first and third layers of material.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
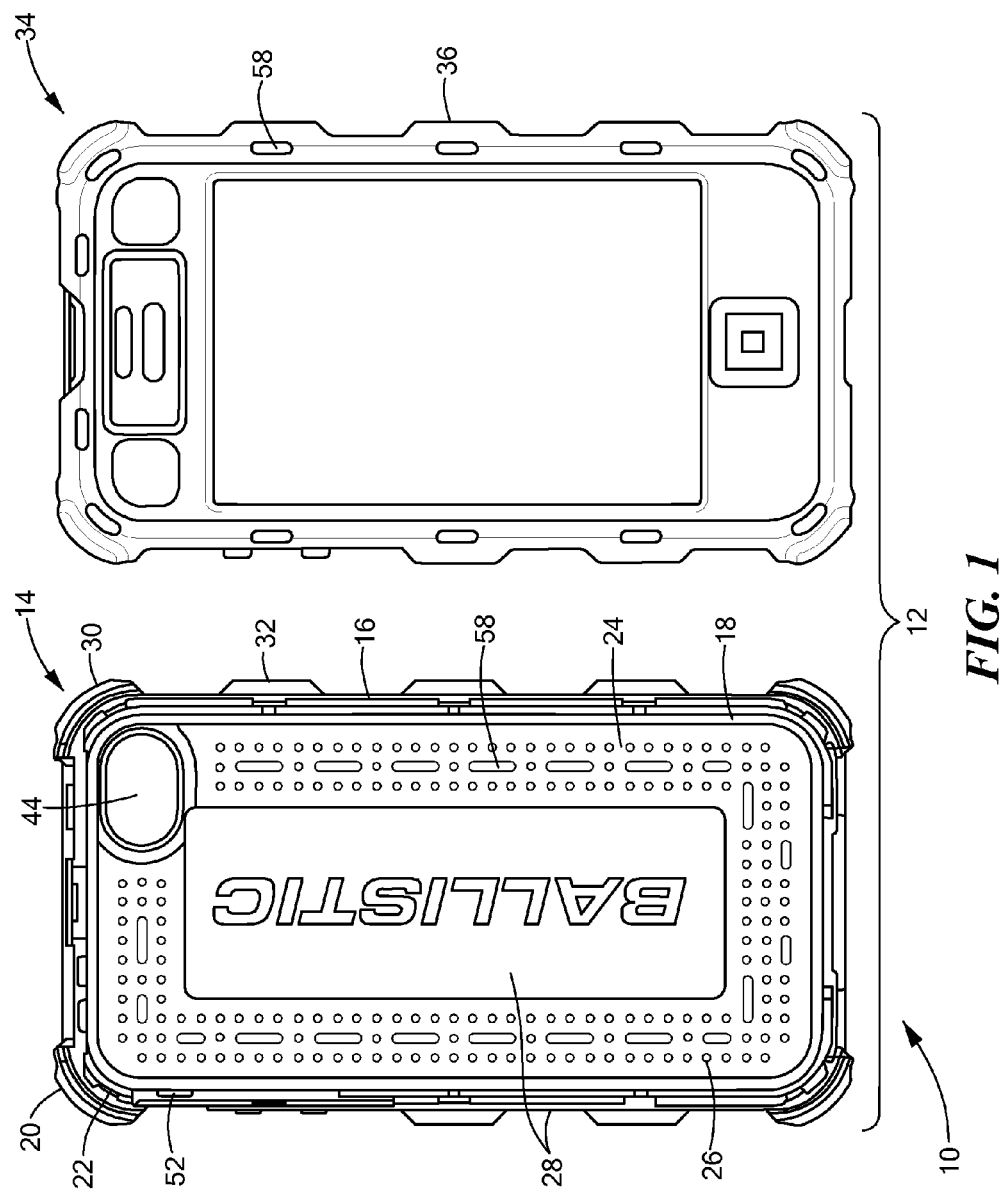
FIG. 1 is front view of the first portion and the second portion of a mobile device case in accordance with the principles of the present invention.

Now referring to the drawings in which like reference designators refer to like elements, there is shown in FIG. 1 a mobile device case constructed in accordance with the principles of the present invention and designated generally as "10." The case 10 may include a housing 12 sized to receive and retain a mobile device. The housing 12 may include a first portion 14 sized to receive the mobile device. For example, the dimensions of the first portion 14 may be prefabricated to contour a specific mobile device, for example an IPHONE, iPAD or other mobile phone or tablet computer, and thus may vary depending on the size of the mobile device.

The first portion 14 may further include a side wall 16 defining a first perimeter 18. The side wall 16 surrounds the first portion 14 and may define a height substantially commensurate with a height of the mobile device housed within the first portion 14, or any height. The first portion 14 may further define curved or substantially right-angled corners 20 depending on the corresponding corners of the mobile device to be retained within the first portion 14. The corners 20 may further define a recess 22 spaced a distance from the side wall 16, such that a space is defined between the corners 20 and the mobile device disposed within the first portion 14. The recess 22 allows the side wall 16 to flex inward the event of impact considerably reducing the impact force transferred to the mobile device.

The first portion 14 of the housing 12 may include and be partially composed of a first layer of material 24. The first layer of material 24 may be composed of a substantially resilient material, for example, thermoplastic polyurethane (TPU) or a material with a similar durometer. In an exemplary configuration, 80% of the first layer of material 24 has a Shore A durometer of substantially 60A and 20% of the first layer of material 24 has a Shore A durometer of substantially 75A. It is further contemplated that a material with a durometer lower than 60A may be used as the first layer of material 24. The first layer of material 24 may define a substantially closed loop about an inner periphery of a first major side 26 of the first portion 14 and/or may be disposed on a portion or all of the first side 26. The first layer of material 24 may operate to cushion the mobile device when disposed within the first portion 14. A pattern may be defined by the first layer of material 24 on the first side 26, for example, a stippled pattern or other patterns that reduce the amount of material used and/or the coefficient of friction of the first layer of material 24 with other surfaces. For example, as shown in FIG. 1, a plurality of slits is defined by the first layer of material 24 at substantially the centerline of the substantially closed loop. The slits may operate to form a support structure in the second material layer 24 such that all three layers of material may be co-molded together, i.e., without having to remove the first portion 14 from the mold prior to depositing the first and third layers of material 24 and 28, respectively, onto the second layer of material 30.

The first layer of material 24 may be co-molded with or otherwise disposed on top of the second layer of material 28, which forms the frame of the housing 12 including the side wall 16. In particular, the second layer of material 28 may be composed of a substantially rigid plastic, for example, polycarbonate (PC), polycarboxylic acid (PCA), or other material with a similar durometer. The second layer of material 28 may have a higher durometer than that of the first layer of material 24, which may lend structural support to the housing 12.

Disposed or otherwise molded onto the surface of the second layer of material 28 may be a third layer of material 30. The third layer of material 30 may have the same, or substantially the same, durometer as the first layer of material 24. For example, the third layer of material 30 may also be composed of TPU or a material with as similar hardness and durometer. The side wall 16 of the first portion 14 may include alternating segments of the second layer of material 28 and third layer of material 30 around the outer surface of the side wall 16. For example, the second layer of material 28 and the third layer of material 30 are disposed adjacent to each other along at least a portion of the side wall 16. In particular, the third layer of material 30 may protrude a distance away from the side wall 16 and be adjacent a flat, or substantially flat, second layer of material 28. For example, the side wall 16 includes a plurality of first segments 32 of the third layer of material 30, on both sides of the side wall 16 and substantially along the entire outer perimeter 18 of the first portion 14. The protruding first segments 32 of the third layer of material 30 provide impact protection should the housing 12 be exposed to an impact force. The protruding first segments 32 may span the height of the side wall 16 and may be substantially rectangular in shape, or any shape or size sufficient to perform the functions described herein. The corners 20 may also include the third layer of material 30 disposed on its surface. For example, each of the four corners 20 may include a first segment 32 of the third layer of material 30 molded to the outer surface of the corners 20 which may protrude a larger or varying distance away from the side wall 16. These raised first segments 32 may operate to absorb an impact force should the housing 12 land on one of the corners 20.

Figure 6:
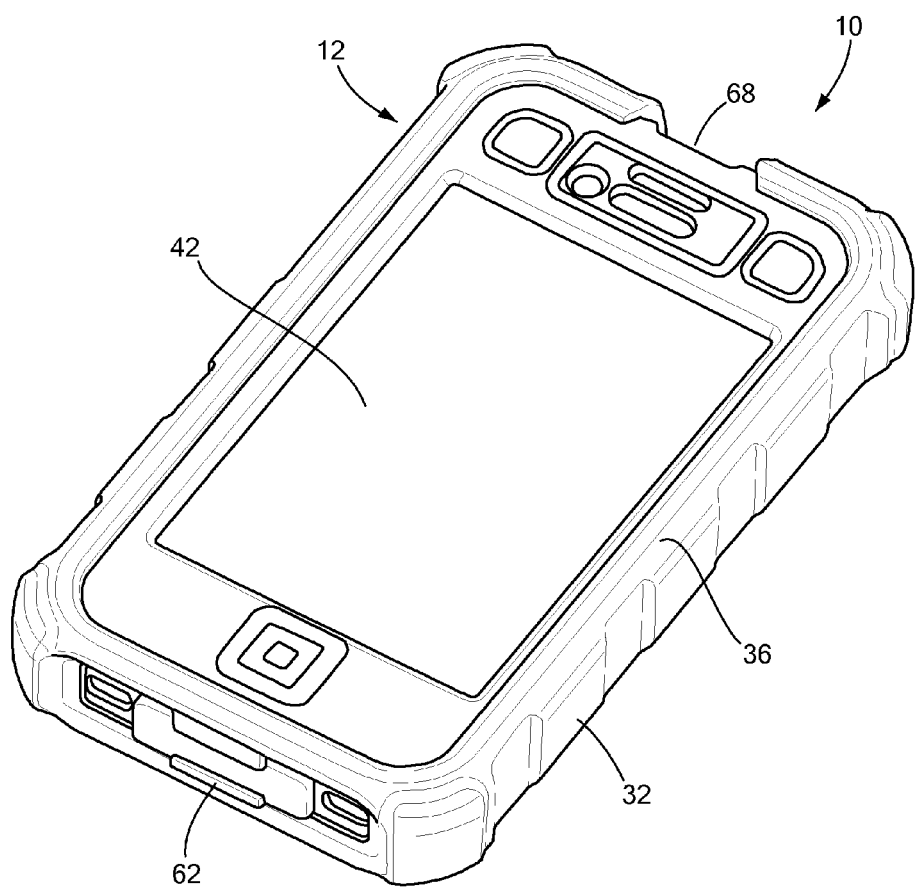
FIG. 6 is an assembled view of the first portion and second portion shown in FIG. 5.

Continuing to refer to FIG. 1, the housing 12 may further include a second portion 34 removeably couplable to the first portion 14. The second portion 34 may be at least partially composed of the same, or substantially the same material as that of the second layer of material 28, for example, PC. One or more layers of TPU, or material with a similar durometer or composition as the first layer of material 24, may be co-molded with the second layer of material 28. For example, the layer of PC material may be disposed between a layer of TPU above and a layer of TPU below, similar to the layering of materials in the first portion 14. In particular, the layer of TPU molded on top of the layer of PCA may define second segments 36 composed of TPU or similar durometer material that correspond to first segments 32 of the first portion 14. For example, as shown in FIG. 6, the second segments 36 are substantially positioned and aligned with the first segments 32 when the first portion 14 is mated with the second portion 34 and extend around the periphery of the second portion 34.

Figure 2:
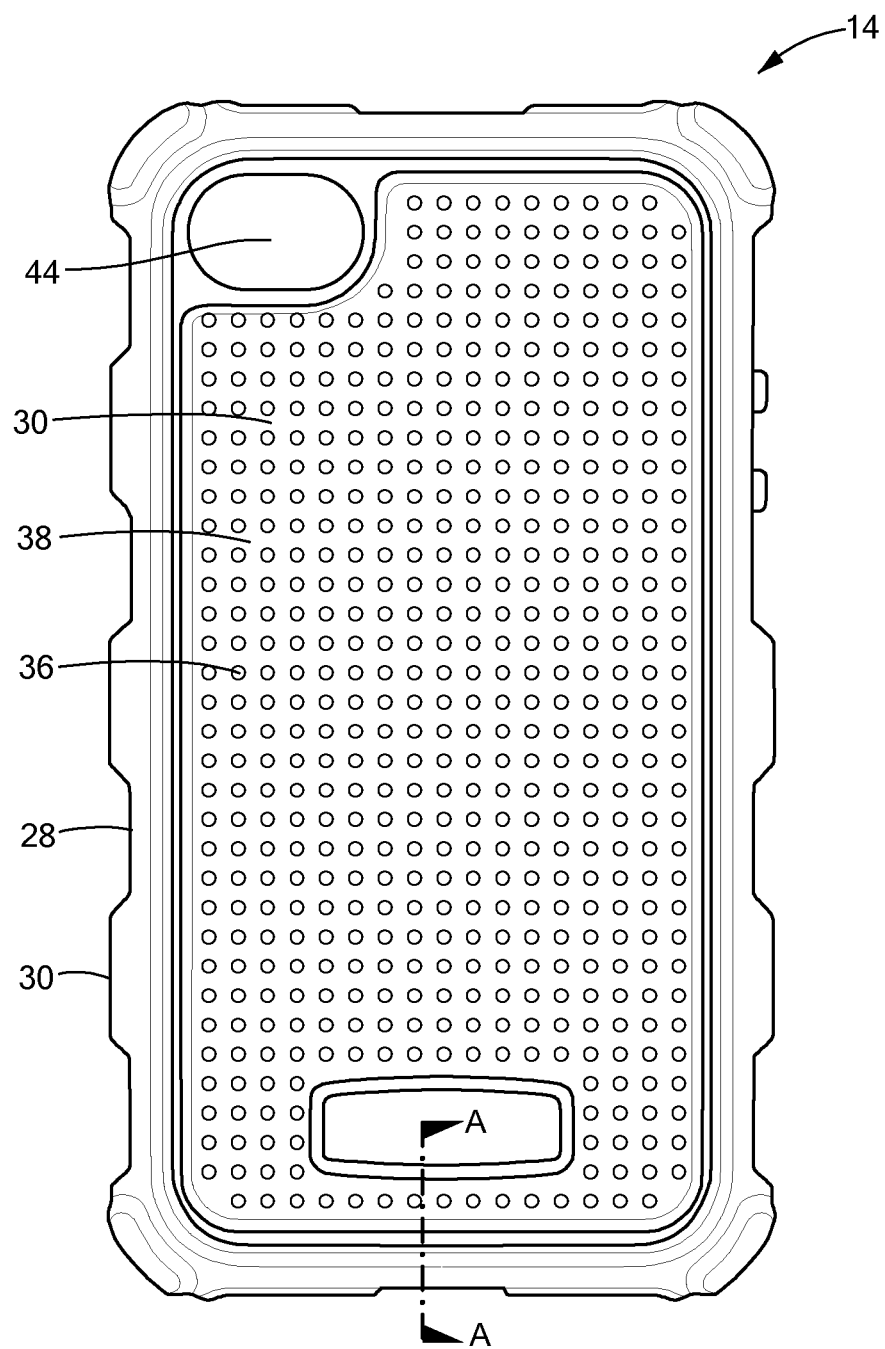
FIG. 2 is a back view of the first portion shown in FIG. 1.

Now referring to FIG. 2, the first portion 14 includes a second major side 38 opposite the first side 26 having the third layer of material 30 deposited on a substantial portion of the second side 38. For example, the third layer of material 30 may be deposited on substantially the entire second side 38 to provide resiliency to the housing 12 should an impact occur. A pattern of alternating portions of the second layer of material 28 and the third layer of material 30 may be disposed on the second side 38 and/or the side wall 16. For example, the second layer of material 28 may define a perimeter about the third layer of material 30 on the second side 38 such that the third layer of material 30 protrudes a distance from the second side 38. Further, the third layer of material 30 may define a textured surface, for example, a stippling pattern, on the second side 38 which may reduce the coefficient of friction with the third layer of material 30 and the user's hand or other surfaces. The stippling pattern may be formed by the creation of plurality of indentations 38 on the third layer of material 30.

Figure 3:
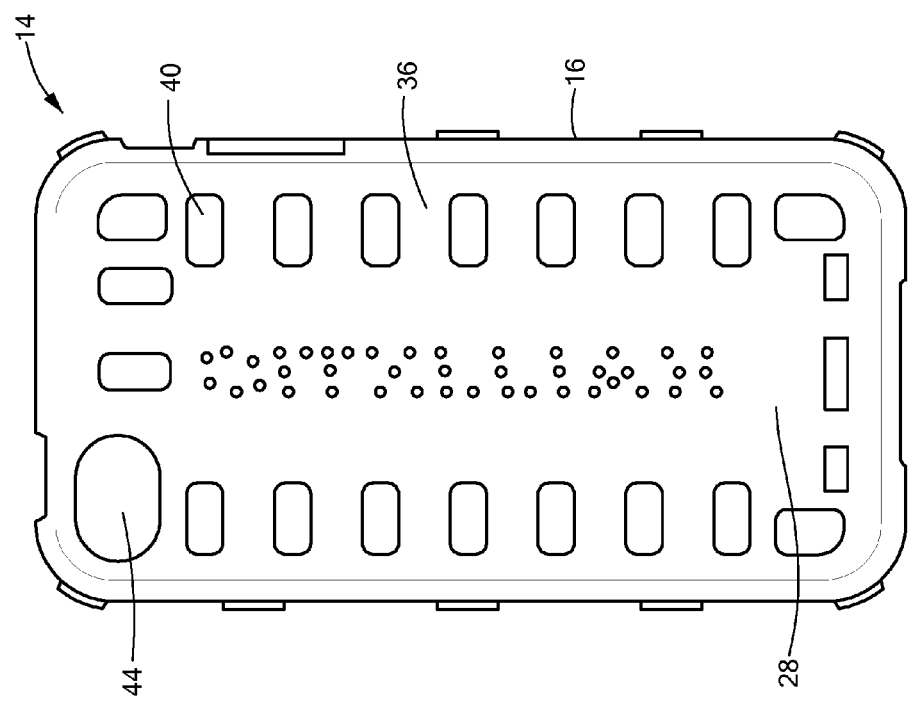
FIG. 3 is back view of the first portion shown in FIG. 2 without the first and third layers of material.

Now referring to FIG. 3, the second layer of material 28 may further define a plurality of openings 40 extending from the first side 26 through a second side 38 of the first portion 14. The openings 40 may be prefabricated such that the first layer of material 24 may be injected through the openings 40 in a fluid state and deposited at desired positions on the first portion 14 where it hardens. For example, the openings 40 may be fabricated such that the first layer of material 24 may be deposited on the surface of the second layer of material 28 in a particular pattern, for example, the substantially closed loop pattern discussed above, or any desired pattern. The second layer of material 28 may further define the dimensions of the side wall 16.

Although not shown in FIG. 3, the second portion 34 may also define a plurality of openings 40 such that the first, second, and third layers of material can be co-molded together on the second portion 34 in accordance with the configurations discussed above with respect to the first portion 14. For example, the second portion 34 may define a plurality of openings 40 along its periphery through which TPU may be injected to form the three layers of material configuration.

Figure 4:
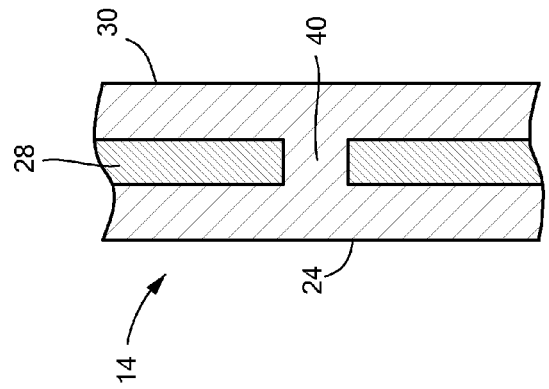
FIG. 4 is a cross-sectional view taken through section A-A in FIG. 2.

Now referring to FIGS. 3 and 4, in a configuration, TPU may be injected in liquid form through the openings 40 to form both the first layer of material 24 and the third layer of material 30 such that the second layer of material 28 is sandwiched or otherwise disposed between the first layer of material 24 and the third layer of material 30 in portions of the first portion 14 when the material hardens. In particular, the first layer of material 24 and the third layer of material 30 may be contiguously connected to each other through the openings 40 such that they are co-molded together. The resulting properties of the first portion 14 therefore may include both the durable features of the second layer of material 28 and the impact absorbing resilient features of the first layer of material 24 and the third layer of material 30.

Figure 5:
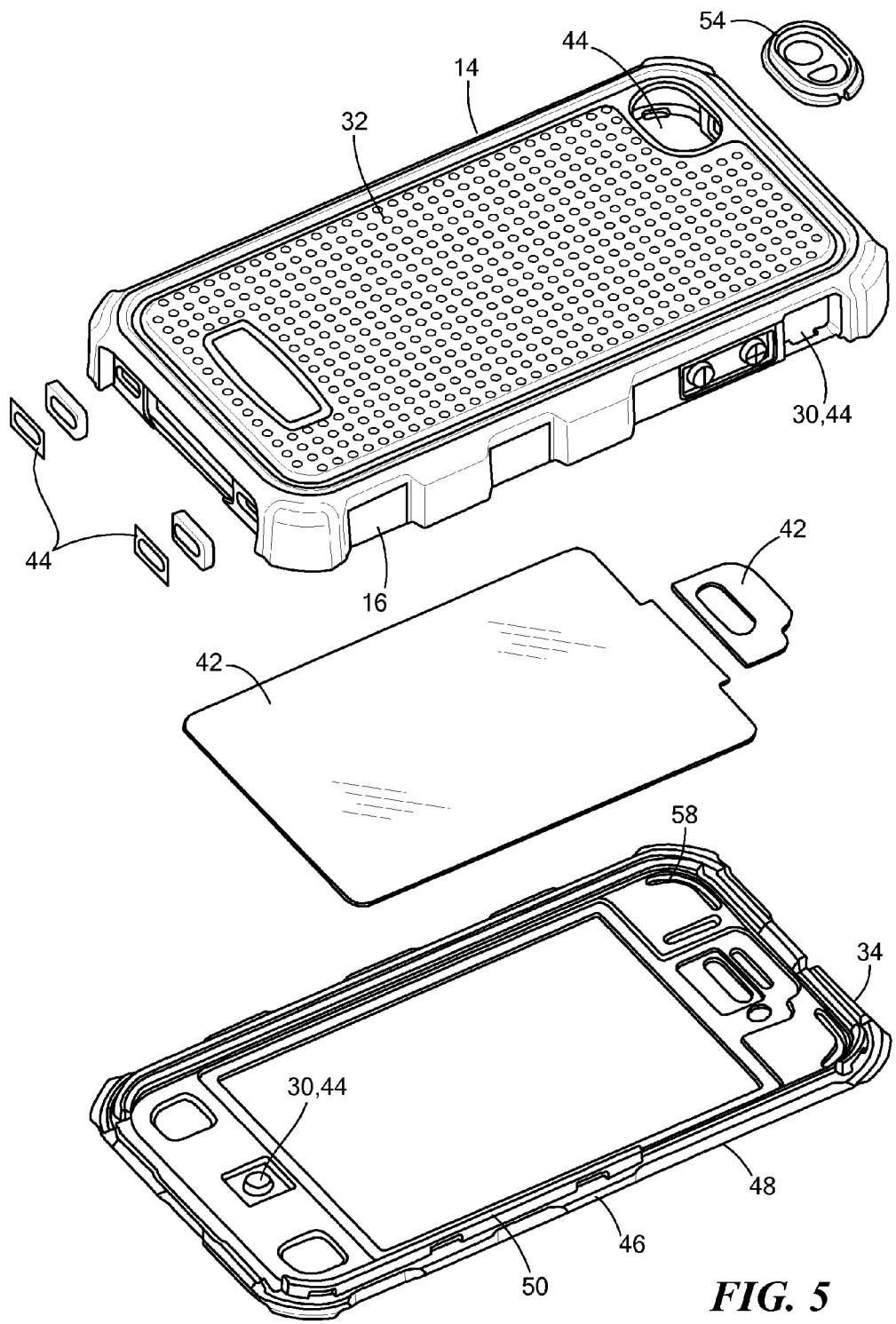
FIG. 5 is a disassembled view of the back portions of the first portion and the second portion shown in FIG. 1.

Now referring to FIG. 5, the second portion 34 may further define an opening and include a substantially transparent or entirely transparent flexible membrane 42 sized to cover the opening. In operation, the flexible membrane 42 covers a touch-screen of a mobile device when the mobile device is disposed within the housing 12. The flexible membrane 42 may operate to prevent the touch-screen from being scratched while maintaining the operation of the touch-screen through the flexible membrane 42. The flexible membrane 42 may also operate to prevent liquids or other debris from entering the housing 12 while maintaining the operation of the touch-screen through the flexible membrane 42.

The second portion 34 may further define portions composed solely of TPU, for example, portions covering actuable buttons, and the location of such portions may vary depending on the device to be enclosed by the housing 12. The first portion 14 may further define a plurality of apertures 44 defined along the side wall 16 and/or the second side 32 sized to receive and/or provide access to one or more controls of the mobile device. For example, the first portion 14 may define an aperture 44 sized to provide access to one or more plug ports in the mobile device, a camera and flash, volume controls, headphones, and the like. Further, the third layer of material 30 may disposed over one or more of the apertures 44 along the side wall 16, first side 26, and/or second side 38. The third layer of material 30 may be fabricated to contour and cover one or more of the apertures 44 that covers one or more of the volume controls or on/off switches of the mobile device. This contoured third layer of material 30 may provide a resiliently pressable surface to allow operation of the volume controls on the mobile device while providing a flexible layer of protection.

The second portion 34 may further define a plurality of grooves 46 along a second perimeter 48 defined by the second portion 34. The second perimeter 48 may define a lip 50 extending substantially orthogonally from the second perimeter 48 which may define the grooves 46. The grooves 46 may be removeably matable with corresponding tabs 52 protruding from the inner portion of the side wall 16 (FIG. 1), such that when the second portion 34 mates with the first portion 14, a substantially enclosed volume is defined therein substantially commensurate with the size of the mobile device to be retained within the volume. The second portion 34 may define a height such that the height of the second portion 34 plus the height of the first portion 14 is substantially the same as the height of the mobile device.

Optionally, a removably insertable camera module 54 may be included sized to fit within the aperture 44 and provide access to a mobile device camera and flash. The camera module 54 may be at least partially composed of the same or similar durometer material as the third layer of material 30 and may include a transparent membrane to protect the camera from scratching or other unwanted debris. The camera module 54 may further define a shape and size such that when the camera is in operation, the camera flash does not interfere with the image capture process. For example, a septum may be defined by the camera module disposed between the aperture 38 for the camera and the aperture 44 for the flash. The septum may operate to minimize interference from the flash on the lens of the camera during image capture.

Figure 7:
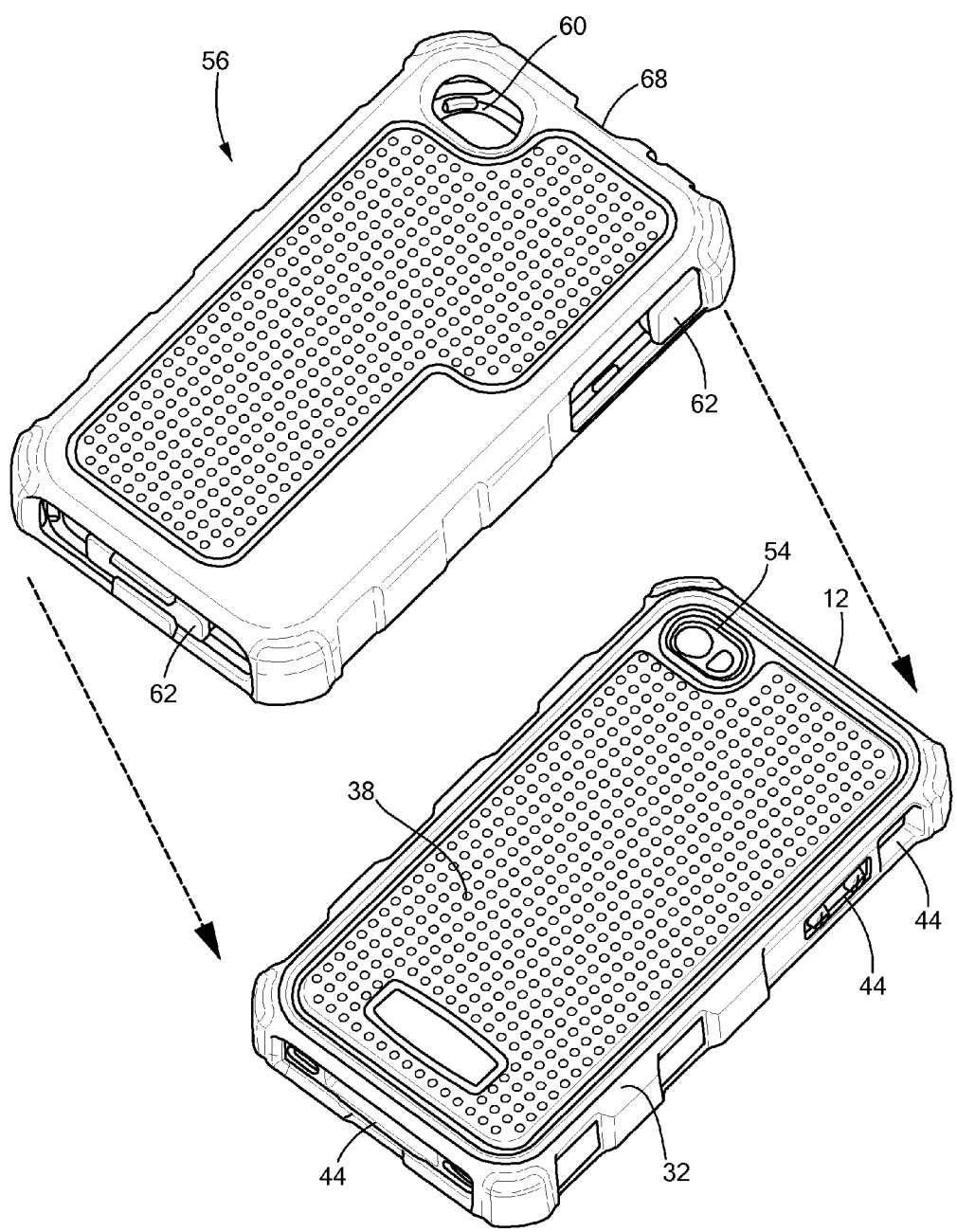
FIG. 7 is a back perspective view of a fourth layer of material partially enclosing the device case shown in FIG. 6.

Now referring to FIGS. 6 and 7, surrounding the housing 12 may be a fourth layer of material 56 sized to surround and contour a portion the housing 12. For example, the fourth layer of material 56 may surround the second side 32 and side wall 16 of the second portion as well as the layer of TPU, or other similar hardness material, disposed around the second perimeter 48 of the second portion 34. The fourth layer of material 56 may include an opening defined such that the touch-screen of the mobile device is accessible and operable when the fourth layer of material 56 is attached to the housing. The fourth layer of material 56 may be an elastomer, for example, silicone or rubber, and may have a durometer less than the durometer of the first layer of material 24 and the third layer of material 30, for example approximately 60A on the Shore A hardness scale.

The fourth layer of material 56 may be removeably attached around the housing 12 such that the housing 12 may provide protection to the mobile device disposed within without the fourth layer of material 56. For example, the fourth layer of material 56 may be a silicon cover sized to contour and receive the first segments 32 and second segments 36 when the second portion 34 is mated with the first portion 14. In particular, the fourth layer of material 56 may define recessed portions within its interior corresponding in size to the protruded distance of the first segments 32 and the second segments 36 such that fourth layer of material 56 contours and fits to the housing 14.

The fourth layer of material 56 may further define apertures 60 similar in size and position of apertures 44 on the housing 12. In particular, when the fourth layer of material 56 is disposed on the housing 12, the apertures 44 and 60 may be substantially aligned to provide access to the various controls and features of the mobile device. Flaps 62 may be included on the fourth layer of material 56, the flaps 62 being sized to removeably insertable within one or more apertures 44 and within one or more apertures defined by the mobile device. For example, one flap 62 may be sized fit within a plug port on the mobile device. The flaps 62 may be movable, flexible, and substantially waterproof, such that fluids are prevented from entering the openings in the mobile device. It is further contemplated that the flaps 62 may be composed of TPU or material with similar hardness, and may be movably coupled to the housing 12 directly, for example, on the first portion 14.

Figure 8:
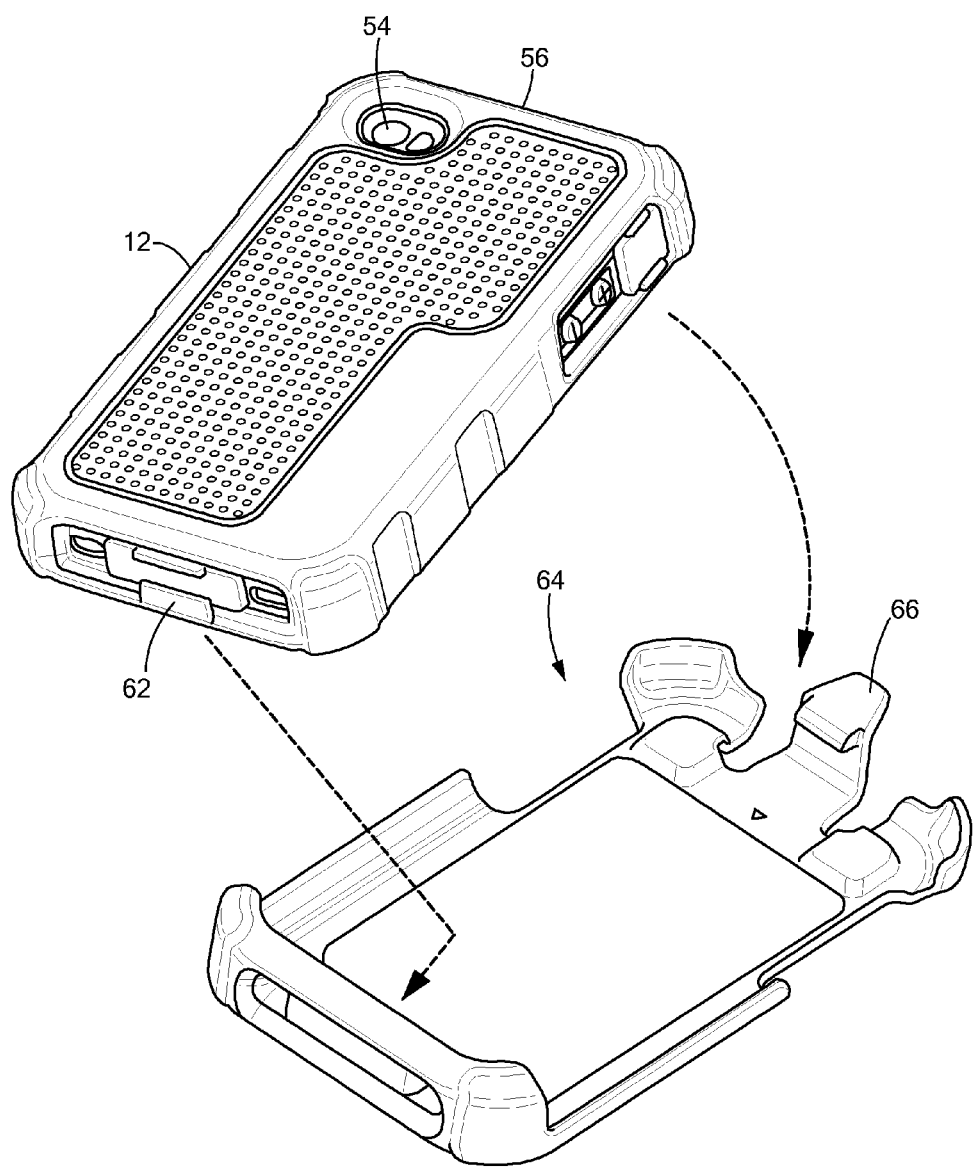
FIG. 8 is back perspective of the device case shown in FIG. 7 disposed within a holster.

Now referring to FIG. 8, the housing 12, whether alone or with the fourth layer of material 56 attached around it may be removeably insertable within a holster 64. The holster 64 may include a latch 66 sized to engage and couple to a latch receiving element 68 (Seen in FIG. 6) defined by the first portion 14. The holster 64 may further be sized to accommodate a mobile device having all four layers of material discussed above disposed around it or the housing 12 alone. This is so because the latch 66 may engage the latch receiving element 68 whether or not the fourth layer of material 56 is disposed around the housing 12. The holster may further include a fixed rotating clip (not shown) such as disclosed and described in U.S. application Ser. No. 12/701,029 entitled FIXED ROTATING CLIP AND METHOD THEREOF, the entirety of which is incorporated herein by reference, which removeably affixes the holster 64 a user belt or hand bag.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A mobile device case, comprising:
   a housing;
   at least a portion of the housing including a first layer of material, a second layer of material, and a third layer of material, the second layer of material being molded between the first and third layers of material and having a higher durometer than the first and third layers of material.

2. The mobile device case of claim 1, wherein the housing further includes a first portion removeably couplable to a second portion, the first portion and the second portion at least partially defining an enclosed volume therein when coupled together.

3. The mobile device case of claim 2, wherein the second portion includes the second and third layers of material, and wherein the third layer of material defines a lip around the periphery of the second portion.

4. The mobile device case of claim 2, wherein the first portion includes the first, second, and third layers of material.

5. The mobile device case of claim 2, wherein the first portion includes a first major side and a second major side opposite the first major side, and wherein the first layer of material defines a substantially closed loop on the first side.

6. The mobile device of claim 2, wherein the first portion includes a side wall defined by the second layer of material, the side wall having an inner surface and an outer surface opposite the inner surface, and wherein the third layer of material is disposed in segments along at least a portion of the outer surface of the side wall.

7. The mobile device of claim 6, wherein the segments of the third layer of material are spaced a predetermined distance from each other.

8. The mobile device case of claim 1, wherein the first layer of material and the third layer of material have substantially the same durometer.

9. The mobile device case of claim 1, further including a fourth layer of material at least partially surrounding the first, second, and third layers of material and wherein the fourth layer of material has a lower durometer than the first and third layers of material.

10. The mobile device case of claim 1, wherein the first portion defines a plurality of openings, and wherein the first layer of material and third layer of material are contiguous with each other through at least a portion of the plurality of openings in the second layer of material.

11. The mobile device case of claim 1, wherein the first and third layers are in contact with each other.

12. A mobile device case, comprising:
    a housing, the housing including a first portion couplable with a second portion, the first portion and the second portion at least partially defining an enclosed volume therein when coupled together;
    at least one of the first portion and the second portion including a first layer of material, a second layer of material, and a third layer of material, the second layer of material being disposed between the first and third layers of material and having a higher durometer than the first and third layers of material; and
    a fourth layer of material surrounding at least portion of the housing, the fourth layer having a lower durometer than the first and third layer of material.

13. The mobile device case of claim 12, wherein the first and third layers are in contact with each other.

14. The mobile device case of claim 12, wherein the first portion includes a side wall defined by the second layer of material, the side wall having an inner surface and an outer surface opposite the inner surface, and wherein the third layer of material is disposed in segments along at least a portion of the outer surface of the side wall.

15. The mobile device case of claim 12, wherein the second portion includes the second and third layers of material, and wherein the third layer of material defines a lip around the periphery of the second portion.

16. The mobile device case of claim 12, wherein the first portion defines a plurality of openings, and wherein the first layer of material and third layer of material are contiguous with each other through at least a portion of the plurality of openings in the second layer of material of the first portion.

17. The mobile device case of claim 12, wherein the first portion defines at least one aperture covered by at least one of the first and third layer of material.

18. The mobile device case of claim 17, wherein at least one of the covered apertures substantially contours and facilitates the actuation of one or more controls of the mobile device.

19. The mobile device case of claim 12, wherein first portion includes the first, second and third layers of material.

* * * * *